(12) United States Patent
Hatakeyama et al.

(10) Patent No.: US 6,648,482 B2
(45) Date of Patent: Nov. 18, 2003

(54) POLYGON MIRROR AND METHOD OF MANUFACTURING THE SAME, OPTICAL SCANNER AND ELECTROPHOTOGRAPH

(75) Inventors: Hideyuki Hatakeyama, Kanagawa (JP); Yasuhiro Matsuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 09/983,435

(22) Filed: Oct. 24, 2001

(65) Prior Publication Data

US 2002/0080503 A1 Jun. 27, 2002

(30) Foreign Application Priority Data

Oct. 26, 2000 (JP) ........................................ 2000-327138

(51) Int. Cl.$^7$ ............................................... G02B 7/182
(52) U.S. Cl. ...................... 359/855; 359/850; 359/900; 359/216; 427/162
(58) Field of Search ................................. 359/216–219, 359/850, 855, 871, 872, 900; 427/162, 169, 355, 358–360, 367

(56) References Cited

U.S. PATENT DOCUMENTS

| | | | |
|---|---|---|---|
| 3,900,595 A | * | 8/1975 | Giori |
| 3,900,672 A | * | 8/1975 | Hammond et al. |
| 4,101,365 A | * | 7/1978 | Fisli ............................ 427/162 |
| 4,379,612 A | | 4/1983 | Matsuoka et al. |

FOREIGN PATENT DOCUMENTS

JP          62-36210          8/1987

* cited by examiner

Primary Examiner—James Phan
(74) Attorney, Agent, or Firm—Fitzpatrick, Cella, Harper & Scinto

(57) ABSTRACT

A polygon mirror that can be manufactured at low cost and high productivity and a method of manufacturing the same, a polygon mirror that can be manufactured at low cost and presents little variations in reflectance in a wide range of angles of incident, an optical scanner and electrophotographic equipment that are less expensive and compact is provided. The polygon mirror has a single layer film formed of a substance having an index of reflection of 1.45 or below on the reflecting surface. The method of manufacturing the prism shaped polygon mirror having a film on the reflecting surface comprises a step of application for applying a solution containing a substance for forming a film on the reflecting surface, and a step of forming a coated film of the solution on the reflecting surface by rotating the polygon mirror, and the solution is applied only in the area of which the distance from the axis of rotation of the polygon mirror is at least Ri in the application step, where Ri is the minimum distance between the reflecting surface and the axis of rotation. The polygon mirror preferably has a film having the distribution of film thickness on the reflecting surface. Such a polygon mirror is included in the optical scanner and electrophotographic equipment.

6 Claims, 9 Drawing Sheets

Rotates for a while and then raises from the coating liquid

Anodization-free polygon (SIM) coated with fluoroacrylate (reflectance : 1.36)

Relation between film thickness and angle dependency of reflectance (fluoroacrylate film : reflectance 1.36)

direction of raising

Reflective surface of a film formed by rotating at 1500rpm

Reflective surface of a film formed by rotating at 2500rpm (laterally inverted)

A frame format of the reflective surface of a film formed by rotating at 1500rpm or less.

A frame format of the reflective surface of a film formed by rotating at 2500rpm or more.

FIG. 8
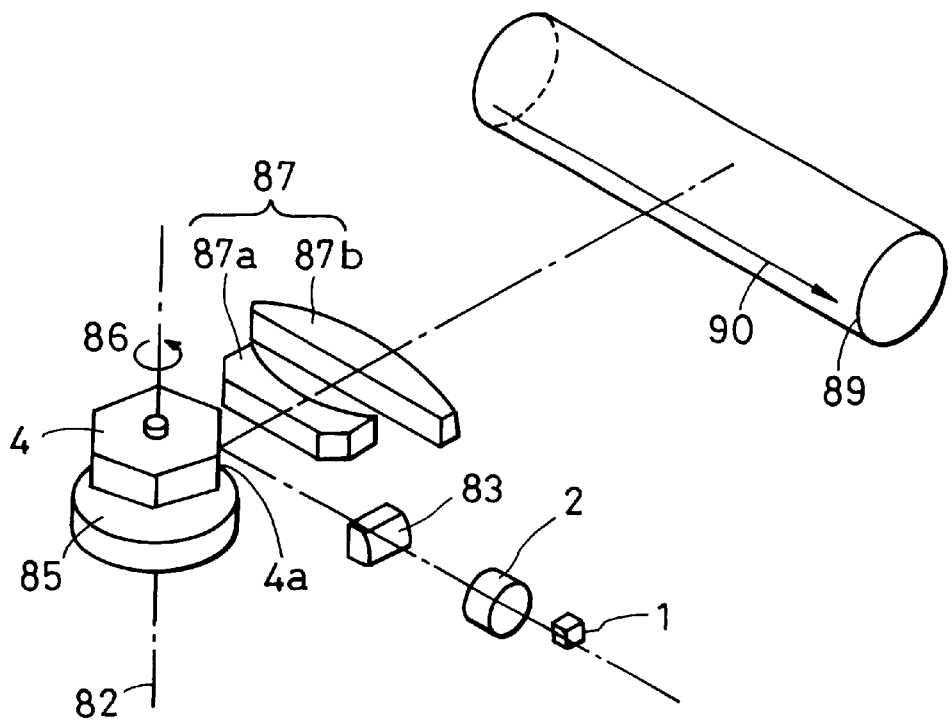
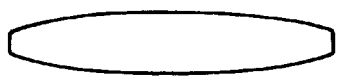
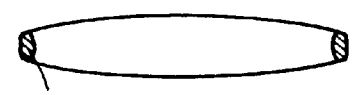
Spindle reflecting surface
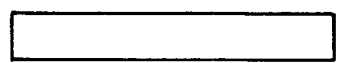
Rectangular reflecting surface
A) normal condition | B) example of running stain | C) example of liquid puddles Coating liquid

POLYGON MIRROR AND METHOD OF MANUFACTURING THE SAME, OPTICAL SCANNER AND ELECTROPHOTOGRAPH

BACKGROUND OF THE INVENTION

1. Field of the Invention

The present invention relates to a reflecting polygon mirror to be mounted on the optical scanner used for electrophotographic equipment or the like, and more specifically, to a film formed on the reflecting surface of the polygon mirror. The present invention also relates to an optical scanner and electrophotographic equipment.

2. Description of the Related Art

Hitherto, in the optical scanner such as a laser beam printer or the like, writing or reading of image information is made by scanning on the surface of an image carrier optically with optically modulated luminous flux (laser luminous flux) via a rotating polygon mirror as is disclosed in Japanese Patent Publication No. 62-36210.

FIG. 8 is a schematic drawing showing an example of the construction of the principal portion of an optical scanner. In FIG. 8, a luminous flux emitted from the light source 1 such as a semiconductor laser or the like is collimated by a collimator lens 2, is condensed by a cylindrical lens 83 that has a reflective power only in the vertical scanning direction, and is linearly projected on the deflecting/reflecting surface 4a of the light deflector 4 constructed of a polygon mirror or the like. The collimator lens 2 and the cylindrical lens 83 constitute an image forming optical system. The luminous flux deflected and reflected on the deflecting/reflecting surface 4a is introduced through a scanning lens 87 comprising a lens 87a having a spherical surface and a negative reflective power and a lens 87b having different reflective powers between two directions orthogonal with each other and a toric surface onto the scanned surface 89 to form a spot. Then, the deflector 4 is rotated about the axis of rotation 82 by means of a motor 85 in the direction shown by an arrow 86 to scan the deflecting scanning surface on the scanned surface 89 optically in the direction shown by an arrow 90 (horizontal scanning direction).

Materials used in the polygon mirror are in many cases aluminum, plastic, glass. Then, the reflecting surface is coated with a vapor deposited film or an oxide film on anode for increasing the reflectance, eliminating the angle dependence, and preventing oxidation.

Since the reflecting surface of the polygon mirror that is used as a light deflector is coated with a reflection increasing film or the like by vacuum deposition, the difference of film thickness due to errors in manufacture or the uneven film thickness due to the method of manufacture results in variations in reflecting characteristics, and thus it requires an evaporation apparatus of high accuracy, an increase in the basic reflectance by employing a multilayer structure for alleviating the impact therefrom, or a special method of evaporating is necessary, which results in increase in cost or decrease in the possibility of film design.

In a technique to apply an amorphous fluorochemical resin film coating over the oxide film on anode, the oxide film on anode decreases the angle dependence of the reflectance and the amorphous fluorochemical resin film increases the durability for dew condensation. This anodic oxidation coating step requires a large apparatus for washing of the polygon mirror sufficiently, which presents a problem in terms of cost.

In order to solve the problem described above, a rotating wet film-forming method in which a single layer film can be formed at lower cost than two exampled above is proposed. However, when a film is formed on the polygon mirror according to the rotating wet film-forming method, the entire reflecting surface is immersed in the coating liquid, and thus the surfaces other than the reflecting surface are also coated with the coating liquid. As a consequent, there are tendencies where the coating liquid applied on the surfaces other than the reflecting surface gathers on the reflecting surface at the time of the rotating film-forming operation, and resulting in significant variations in film thickness or accidental occurrence of irregular film configurations. Therefore, improvement of productivity and decrease in cost of the rotating wet film-forming method has been problems to be solved.

Recently, the range of the angles of incident of the light being projected on the polygon mirror tends to be widened due to the increased requirement of miniaturization of the optical scanner. On the other hand, various optical films are formed on the reflecting surface of the polygon mirror for obtaining angle-independent uniformity of reflectance, and those optical films have an angle at which light of P-polarization is completely transmitted (Brewster's angle), in other words, when the range of the angles of incident is set to the range including Brewster's angle, an angle that coincides with the reflectance of the lower layer exists absolutely. In the polygon mirror that is desired to have a constant reflectance for the range of the angles of incident, presupposing that a film having a uniform thickness is formed, when the angle of incident is wider than Brewster's angle, the range of variations in reflectance increases, and thus angle-independent uniformity of reflectance can hardly be obtained. Therefore, in the related art, it is difficult to obtain a polygon mirror that can accommodate wide range of angles of incident and thus it is difficult to obtain a miniaturized optical scanner.

SUMMARY OF THE INVENTION

Accordingly, it is an object of the present invention to provide a polygon mirror that can be manufactured at low cost and high productivity, and to provide a polygon mirror in which variations in reflectance is small over a wide range of angles of incident, and a method of manufacturing the same.

It is another object of the present invention to provide an optical scanner and electrophotographic equipment of compact size at low cost.

The present invention provides a polygon mirror having a plurality of reflecting surfaces for reflecting light, wherein the reflecting surfaces are provided by forming a single-layer film of a substance having an index of refraction of not more than 1.45 on the base member.

With the reflecting polygon mirror to be mounted on the optical scanner used in electrophotographic equipment or the like according to the present invention, the polygon mirror can be manufactured at lower cost in comparison with vacuum deposition or anodic oxidation coating by forming a single layer of material having an index of refraction of not more than 1.45, more specifically of amorphous fluorochemical resin that is a substance for a film having a low index of refraction on the reflecting surfaces of the polygon mirror according to the rotating wet film-forming method.

With the rotating wet film-forming method for polygon mirrors according to the present invention, variations in film thickness and accidentally occurred irregular film configurations can be prevented by applying the coating liquid only in the area of the polygon mirror of which the distance from the axis of rotation is larger than Ri, where Ri is the shortest distance between the reflecting surface and the axis of rotation for the coating operation, thereby increasing productivity of the polygon mirror and thus decreasing cost of the polygon mirror.

Therefore, the optical scanner of the present invention comprising such a polygon mirror and thus the electrophotographic equipment comprising such an optical scanner can be manufactured at low cost.

In addition, a constant reflectance is ensured over a wide range of angles of incident by realizing suitable distribution of thickness in the film formed on the reflecting surface of the polygon mirror, which contributes to miniaturization of the optical scanner and enables manufacture of the optical scanner at low cost. Accordingly, the electrophotographic equipment of the present invention comprising such an optical scanner can be miniaturized, and manufactured at low cost.

Further objects, features and advantages of the present invention will become apparent from the following description of the preferred embodiments with reference to the attached drawings.

BRIEF DESCRIPTION OF THE DRAWINGS

FIG. 8 is a schematic drawing showing an example of the construction of the principal portion of the optical scanner;

FIG. 9 is a pattern diagram showing irregular film configurations according to the seventh embodiment;

DESCRIPTION OF THE PREFERRED EMBODIMENTS

Figure 1:
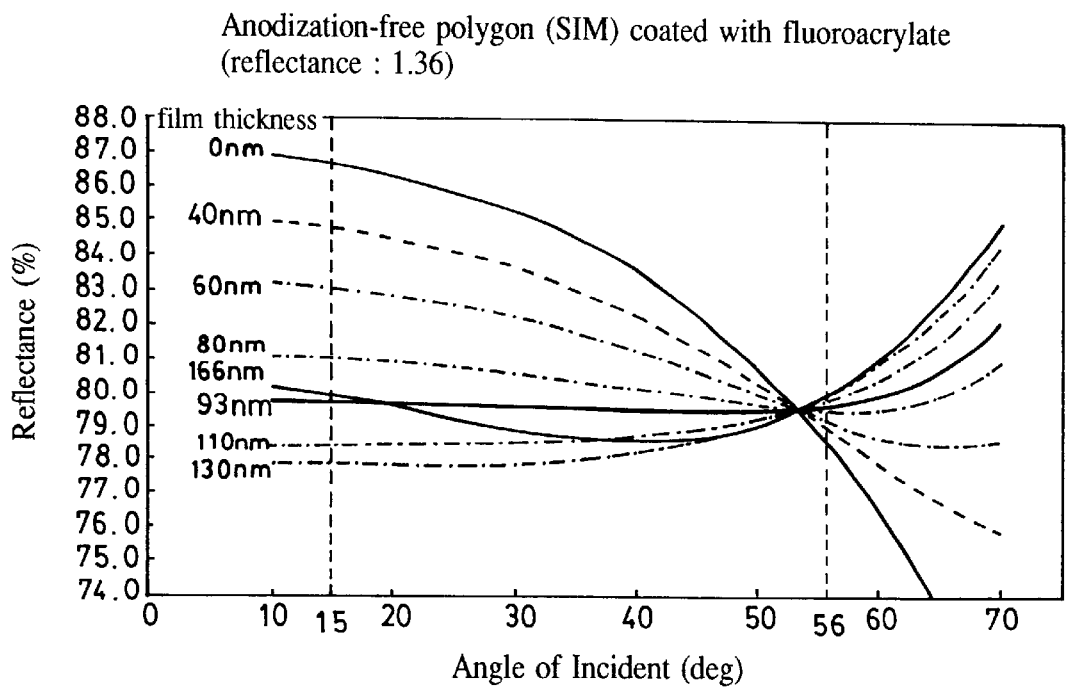
FIG. 1 is a graph showing the relation among film thicknesses, angles of incident, and reflectances according to the Experiment 1.

In the polygon mirror according to the present invention, a substance having an index of refraction of not more than 1.45 is preferably an amorphous fluorochemical resin.

The thickness of the single layer film is preferably 85–110 nm.

The single layer film is preferably formed according to the wet film-forming method. In addition, the single layer film is preferably formed according to the rotation wet film-forming method comprising the steps of applying a solution containing a substance having an index of refraction of not more than 1.45 on the reflecting surface, and rotating the polygon mirror with the reflecting surface faced in the radial direction.

The present invention is a method of manufacturing a polygon mirror including a film formed on the reflecting surface comprising a step of application for applying a solution containing a substance forming the film on the reflecting surface, and a subsequent step of forming coating film for forming a coating film in the form of a solution by rotating the polygon mirror with the reflecting surface faced in the radial direction, wherein variations in film thickness and accidentally occurred irregular film configurations can be prevented by applying the coating liquid only in the area of the polygon mirror of which the distance from the axis of rotation is larger than Ri, where Ri is the shortest distance between the reflecting surface and the axis of rotation for the coating operation.

According to this method, in the step of application, application is preferably performed by filling a solution in the bath and rotating under the condition of $Ri \leq R \leq Ro$, where R is a distance between the surface of the solution in the bath and the axis of rotation, and Ro is a distance between the point within the reflecting surface that is farthest from the axis and the axis.

Application of the coating liquid is preferably performed by rotating the polygon mirror at the speed that does not ruffle the surface of coating liquid too much.

In the step of application, application of the coating liquid is preferably performed by filling a solution in the bath and immersing the polygon mirror in the solution in such a manner that the reflecting surfaces are sequentially brought into contact with the surface of the solution in the bath.

Alternatively, in the step of application, application is preferably performed by pushing a soft medium impregnated with the solution against the reflecting surface.

In the step of application, it is also preferable to perform application by spraying the coating liquid only on the reflecting surface.

The present invention provides a polygon mirror manufactured according to the method described above.

The present invention provides a polygon mirror having a plurality of reflecting surfaces for reflecting light, wherein the reflecting surface is provided with a film having a distribution of film thicknesses.

In such a polygon mirror, preferably, the distribution of film thicknesses is such that the reflectance given at the Brewster's angle is obtained at the position corresponding to the angles of incident of 10–70°.

It is also preferable that the area accommodating the angles of incident narrower than Brewster's angle has a uniform film thickness, and the area accommodating the angles of incident exceeding Brewster's angle has such a film thickness that the reflectance given at Brewster's angle can be obtained.

Alternatively, it is preferable that the distribution of film thicknesses is inclined so as to get thinner constantly toward the position corresponding to the angles of incident from 10° to 70°.

The present invention also provides an optical scanner comprising a light source, an image forming optical system for converging light emitted form the light source and forming an image, a light deflector for deflecting and reflecting the imaged light, and a scanning lens for introducing the deflected light to the scanned surface, wherein the light deflector is provided with the polygon mirror described above.

The present invention further provides an electrophotograph comprising means for charging the photoreceptor, exposing means for exposing the charged photoreceptor and forming a latent image, toner image forming means for supplying toner to the latent image and forming a toner image, transferring means for transferring the toner image onto a transcriptional material, and cleaning means for removing residuals or foreign substances from the surface of the photoreceptor, and the exposing means is the optical scanner.

In other words, the present invention provides a reflecting polygon mirror to be mounted on the optical scanner used in the electrophotographic equipment or the like wherein a single layer film of a substance having index of refraction of not more than 1.45 is formed on the reflecting surface of the polygon mirror.

With the single layer film formed on the reflecting surface, the dependence of the reflectance on the angle of incident of light projected onto the reflecting surface may be suppressed. Therefore, accurate control of film thickness is not necessary when forming the film.

The single layer film may be formed according to the vacuum film-forming method as represented by vapor deposition or spattering, or the wet film-forming method using a solution. However, since the apparatus used in the vacuum film-forming method requires high cost of equipment, the wet film-forming method that can be performed at low cost of equipment is especially preferable.

The wet film-forming method is a method in which a desired film is formed by the steps of applying a solution containing desired film material or a precursor of film material onto the base member, and removing solvent of the solution or allowing the precursor to react, or a method in which a desired film is formed by the reaction of a substance in the solution with the base member in the solution.

The wet film-forming method includes a solution wet film-forming method as represented by dip coating or spin coating, or an anodic oxidation coating that can be employed for forming a film of aluminum oxide when the base member of the polygon mirror is formed of aluminum. However, it is preferable to employ the solution wet film-forming method that requires less expense for coating equipment.

The solution wet film-forming method is a method for forming a film by applying a solution made by dissolving a substance for forming a film in a solvent onto the surface on which the film is formed, and drying or sintering the same.

While the dip coating and the spin coating are suitable for forming films on one surface or two parallel surfaces, the rotation film-forming method in which the reflecting surfaces are faced in the radial direction of rotation is most preferable for forming a film on the polyhedron such as the polygon mirror. The term "facing the reflecting surface in the radial direction of rotation" means that the normal line of reflecting surface coincides with the radial direction of rotation.

The film material to be formed on the reflecting surface of the polygon mirror, which may be determined considering durability under the service condition, may be an amorphous fluorochemical resin, fluoroacrylate, or silica dioxide. Among others, the amorphous fluorochemical resin that is inactive for ozone or water and that exhibits no corrosion in itself and in base member is especially preferable. As amorphous fluorochemical resin, a substance as shown in the constitutional formula (1) and the constitutional formula (2) may be used.

[Ch.1]

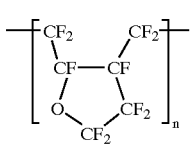
(1)

[Ch.2]

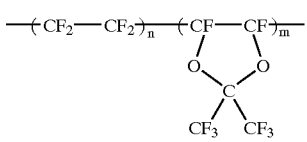
(2)

Since the index of refraction of the amorphous fluorochemical resin is 1.34 for the light having a wavelength of 680 nm, when a film of this amorphous fluorochemical resin is formed on the reflecting surface of the polygon mirror to the thickness of 88–109 nm, the variations in reflectance by the angles of incident within the range of 15°–56° can be restrained to ±1%.

When forming a film of the thickness described above according to the rotating film-forming method, the slower evaporation of the solvent during the process of film formation is more desirable. The speed of evaporation of the solvent decreases with elevation of the boiling point of the solvent. Therefore, the preferable boiling point of the solvent is at least 180° C. The preferable solvent evaporates at the temperature that does not deform the base member. For example, when the aluminum base member is employed, the boiling point of the solvent is preferably not more than 280° C.

Other preferable physical properties of the solvent are that the construction is not varied due to the environment, and that it has no odor in terms of operational environment.

For example, the solvent shown by the constitutional formula (3) may be preferably used.

[Ch.3]

(3)

The base member on which the single layer film is not limited as far as it can be used for the polygon mirror, such as aluminum, plastic, glass, and the like.

In the polygon mirror including the single layer film of an amorphous fluorochemical resin formed on the base member, rotation at about 2000–4000 rpm for more than 60 seconds is preferable in order to form a uniform film at high productivity without leaving solution at the end of the reflecting surface after a film is formed by rotation or leaving stain of solution streak on the reflecting surface.

In the method of forming a film by rotation on the polygon mirror including the single layer film of an amorphous fluorochemical resin formed on the base member, a solution of 1.5–3.0% is most preferably used in order to form a film of desired thickness at high productivity when the film is formed at the number of revolutions described above for the period of time described above.

According to the film-forming method described above, the polygon mirror that is low in angle dependence of the reflectance and superior in durability for dew condensation on the reflecting surface may be manufactured at extremely low cost. In other words, the optical scanner or the electrophotographic equipment or the like comprising the polygon mirror having a film formed according to the technique described above can be manufactured at lower cost in comparison with those in the related art.

The rotating wet film-forming method comprises a step of application for applying the coating liquid on the reflecting surface of the polygon mirror, and subsequently, a step of controlling the film thickness for obtaining the desired film thickness by rotating the polygon mirror while controlling the number of revolutions. Generally, it also includes a sintering step for blowing the solvent contained in the coating liquid and drying and fixing the film. In the step of application of the rotating wet film-forming method, preferably, the coating liquid is applied in the area of the polygon mirror of which the distance from the axis of rotation is larger than Ri, where Ri is the shortest distance between the reflecting surface and the axis of rotation. The thing that holds the area of application under control is the step of applying the desired coating liquid on the reflecting surface before starting rotation that controls the film thickness. Even when the coating liquid is applied to the area of which the distance from the axis of rotation is less than Ri in the coating step, the film thickness can be controlled as far as the coating liquid is applied on the reflecting surface sufficiently. However, in terms of controlling variations in film thickness or accidental occurrence of irregular film configurations, it is especially preferable to apply the coating liquid only in the area of which the distance from the axis of rotation is Ri or more.

As an example of the methods of applying the coating liquid on the reflecting surface is that the reflecting surface is immersed in the coating liquid while rotating the polygon mirror. In this case, in order to apply the coating liquid only in the area of which the distance from the axis of rotation is Ri or more, the distance between the axis of rotation and the surface of the coating liquid must be Ro or less, and the distance between the reflecting surface and the axis of rotation must be Ri or more, where Ro is the distance between the point within the reflecting surface that is farthest from the axis and the axis. In the case where the polygon mirror in the shape of a regular n-gonal prism with the reflecting surface being formed in the shape of a regular n-gonal prism is rotated about the central axis of the regular n-gonal prism for application of the coating liquid, Ri corresponds to the radius of the cylinder inscribed in the reflecting surface, Ro corresponds to the radius of the cylinder circumscribed on the reflecting surface. Therefore, the area of $Ri \leq R \leq Ro$ is the area between the inscribed cylinder and the circumscribed cylinder, where R is the distance between the surface of the solution and the axis of rotation. In this case, the relation between Ro and Ri is $Ri/Ro=\cos$ (circle ratio/n).

The number of revolutions for immersing the reflecting surface in the coating liquid while rotating the polygon mirror is preferably such that the surface of the coating liquid is not ruffling too much. The term "not ruffling too much" means that the coating liquid does not come into contact with the area of which the distance from the axis of rotation is less than Ri. For example, in the case of the six-surface polygon mirror of which a radius of the circumscribed cylinder is 20 mm and the reflecting surfaces form a hexagonal prism, the number of revolutions is preferably 200 rpm or less.

Another example of the methods of applying the coating liquid on the reflecting surface is that the coating liquid is applied only on the reflecting surface by sequentially immersing the reflecting surface into the coating liquid so as to bring the reflecting surface into contact with the surface of the coating liquid while keeping the reflecting surface in parallel with the surface of the coating liquid. In this case, preferably, the reflecting surface is brought into contact with the surface of the coating liquid while keeping constant rotation in order to prevent the coating liquid from spreading to the area of which the distance from the axis of rotation is less than Ri (inside the inscribed cylinder in the case of the regular n-gonal polygon mirror) by being gravitated.

Another example of the methods of applying the coating liquid on the reflecting surface is that the soft medium impregnated with the coating liquid against the reflecting surface. In this case, the medium that is soft enough to prevent the reflecting surface from being scratched when it is pushed against the reflecting surface, and that can contain sufficient amount of the coating liquid may be selected. For this purpose, sponge foam is especially preferable.

Still another example of the methods of applying the coating liquid on the reflecting surface is that the coating liquid is sprayed on the reflecting surface. In this case, preferably, the coating liquid is sprayed perpendicularly with respect to the axis of rotation of the polygon mirror, and the coating liquid is sprayed at an angle of elevation.

When the coating liquid is applied on the reflecting surface in the technique described above, the area of application on the polygon mirror is only the area of which the distance from the axis of rotation is not less than Ri (outside the inscribed cylinder in the case of the regular n-gonal polygon mirror), thereby decreasing variations in film thickness, obtaining films of high quality constantly, preventing occurrence of accidental irregular film configurations, decreasing loss due to defective manufacture, and enabling the polygon mirror to be manufactured at high productivity and low total cost. In addition, the optical scanner or the electrophotographic equipment or the like comprising the polygon mirror formed with a film with the technique described above may be manufactured at lower cost and higher quality in comparison with those in the related art.

Preferably, intentional provision of suitable thickness distribution on the film to be formed on the reflecting surface can further suppress the angle dependence of the reflectance, which contributes to manufacture further miniaturized optical scanner.

Generally, when the film has such a thickness that no multiple reflection occurs in the film, the reflectance tends to decrease with increase in film thickness in the area that accommodates a range of the angles of incident narrower than Brewster's angle. On the other hand, in the area that accommodates a range of the angles of incident wider than Brewster's angle, the reflectance tends to increase with the film thickness. The present invention benefits form these properties.

In other words, since the film thickness having the same reflectance as that given at Brewster's angle can be obtained logically for each angle of incident, it is especially preferable to form a film having a obtained film thickness faithfully on the reflecting surface in terms of restraining the angle dependence of the reflectance.

When the angle of incident of P polarization is confined to the angles narrower than Brewster's angle, it is easy to realize uniformity of reflectance with uniform film thickness. In this case, the reflectance abruptly increases in the range wider than Brewster's angle. Therefore, almost ideal film configuration may be realized by ensuring uniformity of reflectance in the area that accommodates the angles of incident narrower than Brewster's angle with a desired uniform film thickness, and decreasing the film thickness in the area that accommodates the angles of incident wider than Brewster's angle. This technique is especially preferable because formation of the film is easier than the case where the film thickness varies all over the surface of the film.

In the method of forming a film that is generally used for forming a film on the polygon mirror, advanced technique is required or the number of the process increases to obtain a preferred film thickness. Therefore, obtaining almost ideal film configuration by providing uniformly inclined distribution of film thickness is preferable in terms of actual production.

Though formation of a film having such film thickness distribution is possible with the dipping method in which the raising speed is controlled, the rotating wet film-forming method is especially preferable for the polyhedron polygon mirror. In the rotating wet film-forming method, the solution is applied on the reflecting surface, and the solution is gathered on the leaving side of the polygon rotation (upstream of the direction of rotation) in the process of rotation, to form a film having inclined thickness from the entering side (downstream of the direction of rotation) toward the leaving side. The inclination can be controlled by the number of revolutions or concentration of the solution.

In the present invention, the mode of the light deflector is not specifically limited other than that the polygon mirror of the present invention is included, and any mode may be employed as far as it is a optical scanner that can be used for the electrophotographic equipment.

In the present invention, the mode of the optical scanner is not specifically limited other than that the light deflector described above is included, and any mode may be employed as far as it is a optical scanner that can be used in the electrophotographic equipment.

In general, the optical scanner comprises a light source, an image forming optical system for converging light emitted from the light source and forming an image, a light deflector for deflecting and reflecting the imaged light, and a scanning lens for introducing the deflected light to the scanned surface. The optical scanner of the present invention has such a construction and further including a polygon mirror described above in the light deflector.

The mode of the electrophotographic equipment of the present invention is not specifically limited other than that the optical scanner described above is included, and the electrophotographic equipment of the present invention includes an electrophotograph comprising means for charging the photoreceptor, exposing means for exposing the charged photoreceptor and forming a latent image, toner image forming means for supplying toner to the latent image and forming a toner image, transferring means for transferring the toner image onto a transcriptional material, and cleaning means for removing residuals or foreign substances from the surface of the photoreceptor, and the exposing means is the optical scanner.

EMBODIMENT (Experiment 1)

In this experiment, the base member of the polygon mirror was measured by an ellipsometer to estimate the optical physical property of the reflecting surface of the polygon mirror, then the film formed by dipping the glass plate in the coating liquid and dried was measured by the ellipsometer in the same manner to estimate the optical physical property of the film material, and the reflectance of the film material applied on the polygon mirror was numerically analyzed.

Aluminum was used for the base member of the polygon mirror, and the coating liquid used here was the one obtained by dissolving 2 wt % of fluoroacrylate in a substance shown in the constitutional formula (3) (the name of the commodity: CT-solv.180: Asahi Glass Company).

Figure 2:
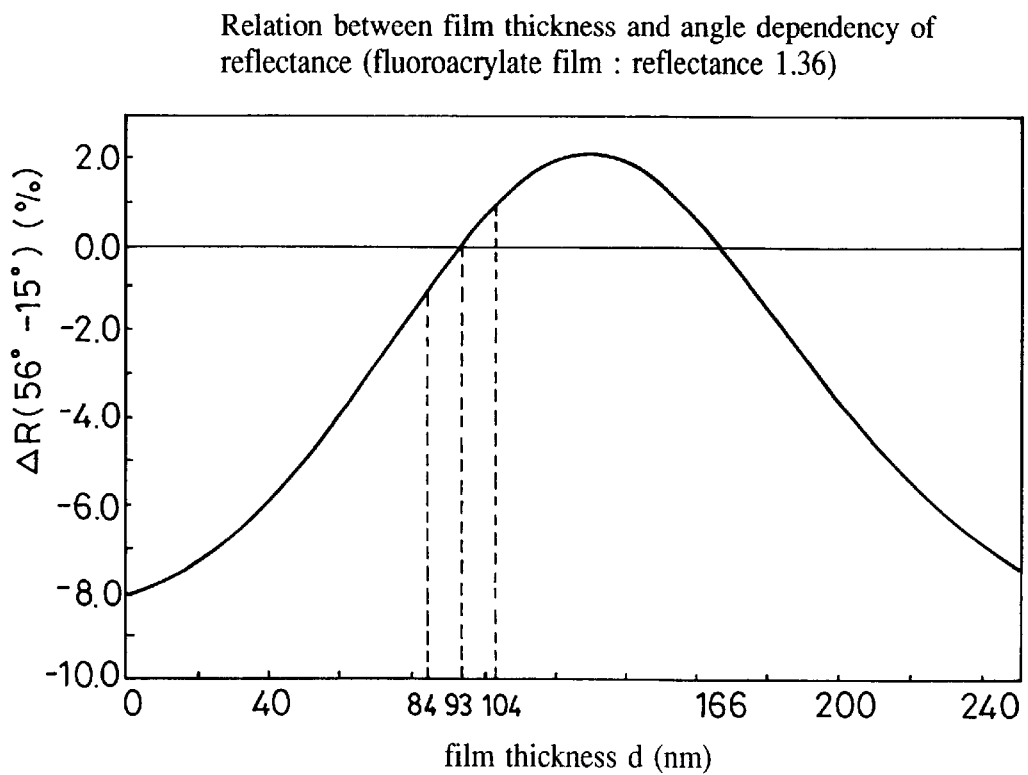
FIG. 2 is a graph showing the relation between film thicknesses and variations in reflectance by the angles of incident within the range of 15°–56° according to the Experiment 1.

FIG. 1 and FIG. 2 show the result of the numerical analysis of the case where the film was formed on the polygon mirror with the film material in the manner described above. The horizontal axis of FIG. 1 represents the angles of incident of light, and the vertical axis represents the reflectances. The horizontal axis of FIG. 2 represents the film thickness on the reflecting surface of the polygon mirror, and the vertical axis represents the variations in reflectance by the angles of incident within the range of 15°–56°. From FIG. 2, it is found that the film thickness with which the difference in reflectance becomes zero is 93 nm and 166 nm. However, according to FIG. 1, with the film thickness of 166 nm, the reflectance varies significantly according to the angles of incident. Therefore, it is referable that the film thickness of which the difference in reflectance is not more than 1% is between 84 and 104 nm.

The results of numerical analysis on other film materials are shown in Table 1 with the result shown above.

TABLE 1

| Film material | Amorphous fluorochemical resin | Fluoro-acrylate | $SiO_2$ | $TiO_2$ |
|---|---|---|---|---|
| Index of refraction | 1.34 | 1.36 | 1.45 | 1.93 |
| Film thickness with which the difference in reflectance between the angles is not more than 1% (nm) | 88–109 | 84–104 | 73–87 | 49–55 |

As seen in Table 1, the smaller the index of refraction, the wider the range of the film thicknesses with which the difference between the angles is not more than 1% is, and thus it is referable that a substance of which the index of refraction is lower is better for reducing angle dependence of the reflectance. More preferably, an amorphous fluorochemical resin is the most suitable for the purpose of the present invention.

[Embodiment 1]

This embodiment shows that the angle dependence of the reflectance can be suppressed by applying an amorphous fluorochemical resin on the aluminum base member.

Figure 3:
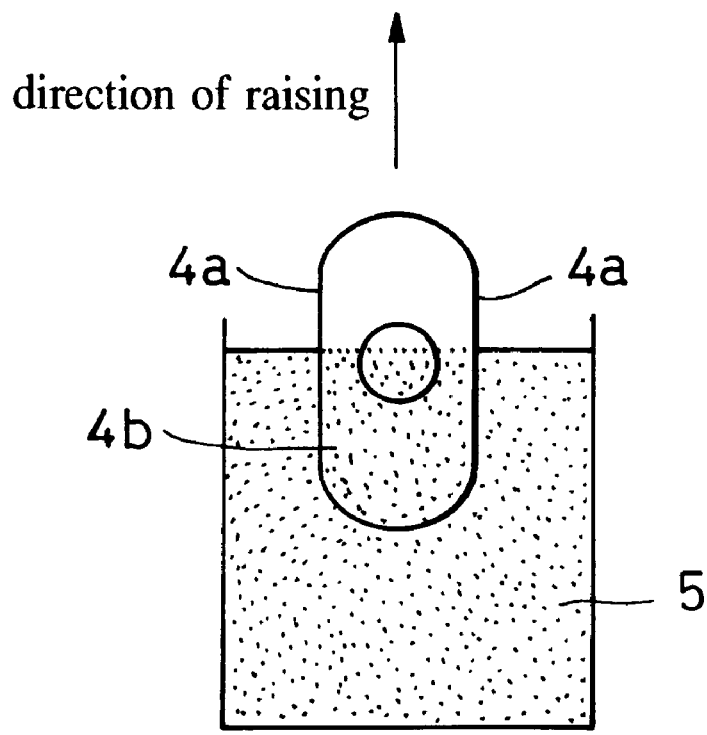
FIG. 3 is an explanatory drawing showing dipping operation according to the first embodiment.

Dipping method that is a typical wet film-forming method is performed. As shown in FIG. 3, a polygon mirror (before film formation) 4b having two parallel reflecting surfaces 4a and formed of aluminum was immersed entirely into the coating liquid 5, raised from the coating liquid 5, and sintered to form an amorphous fluorochemical resin film thereon. Then the reflectance of the reflecting surface was measured.

Using the coating liquid obtained by dissolving 2 wt % of an amorphous fluorochemical resin (Name of the commodity: Cytop CTL-802: Asahi Glass Company) in a substance shown in the constitutional formula (3), the polygon mirror was raised at the speed of 80 mm/min, and sintered at 170° C. for 30 minutes. As a consequence, a film of about 100 nm in thickness is formed, and the variations in reflectance by the angles of incident within the range of 15°–56° were restrained to 1.0% or below.

[Embodiment 2]

This embodiment shows that the rotating wet film-forming method according to the present invention is effective when an amorphous fluorochemical resin is applied on the polygon mirror that is a polyhedron.

Figure 4:
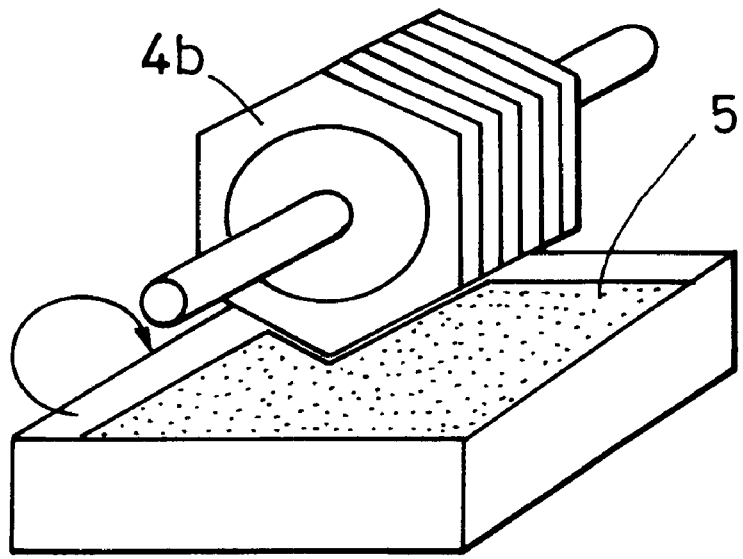
FIG. 4 is an explanatory drawing showing a rotating wet film-forming method according to the second embodiment.

Six polygon mirrors 4b before film formation, formed of aluminum, being 40 mm in diameter of the circumscribed cylinder, and having six reflecting surfaces formed into regular hexagonal prism shape were put on a shaft as shown in FIG. 4. Then the polygon mirrors were immersed into the bath filled with a solution of an amorphous fluorochemical resin (Name of the commodity: Cytop CTL-802: Asahi Glass Company) at the concentration of 2.9% (solvent is a substance shown in the constituent formula (3) (Name of the commodity: CT-solv.180: Asahi Glass Company)) to the depth of 1.2 mm, while rotating the reflecting surfaces at 40 rpm. Then the polygon mirrors were raised to separate the reflecting surfaces from the solution and rotated at 2000 rpm for 120 seconds to form a thin film, and then sintered at 170° C. for 30 minutes. As a consequence, an amorphous fluorochemical resin film of about 100 nm in thickness was formed uniformly on every six reflecting surfaces, and the variations in reflectance by the angles of incident within the range of 15°–56° were within 1.0%.

From the results obtained after conducting the endurance tests for dew condensation and for ozone on the polygon mirror obtained in the manner described above, it was found that an amorphous fluorochemical resin film is a film that is superior in moisture resistance and ozone resistance.

In the endurance test for dew condensation, the polygon mirror formed with the amorphous fluorochemical resin film was left to stand in the furnace of 60° C., 90% for 10 hours, and this test was repeated three times. Before and after each test, variations in reflectance were observed. Even after the third test, the deterioration of reflectance was not more than 2%, which indicated that the reflectance varied little if anything. In the endurance test for ozone, the polygon mirror formed with the amorphous fluorochemical resin film is left to stand under the environment of 45° C., 95%, and 1 ppm in ozone concentration for 100 hours, and the reflectances were measured before and after the test. No deterioration of the reflectance was seen.

In other words, even after repetition of the endurance test for dew condensation, the deterioration in reflectance was kept within 2.0%, and in the endurance test for ozone, no variation was observed. Therefore, it was found that the amorphous fluorochemical resin was superior in moisture resistance and in ozone resistance, and was very effective as a coated film on the reflecting surface of the polygon mirror.

[Embodiment 3]

This embodiment shows the technique to obtain the number of revolutions and the time period of rotation that are optimal for forming a uniform film when applying an amorphous fluorochemical resin on the polygon mirror being 40 mm in diameter of circumscribed cylinder, being formed of aluminum, and having the six reflecting surfaces formed into regular hexagonal prism shape.

Determining only the number of revolutions and the time period of rotation as parameters, and the rotating wet film-forming was performed in the same manner as Embodiment 2.

Figure 5A:
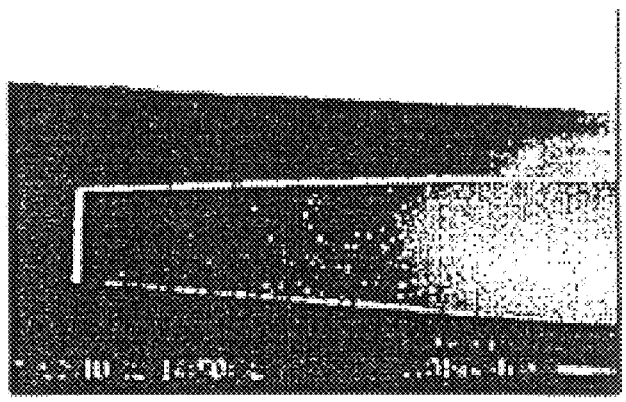
FIGS. 5A and 5B are explanatory photographs showing "liquid paddles" and "running stain" respectively according to the third embodiment.
Figure 5B:
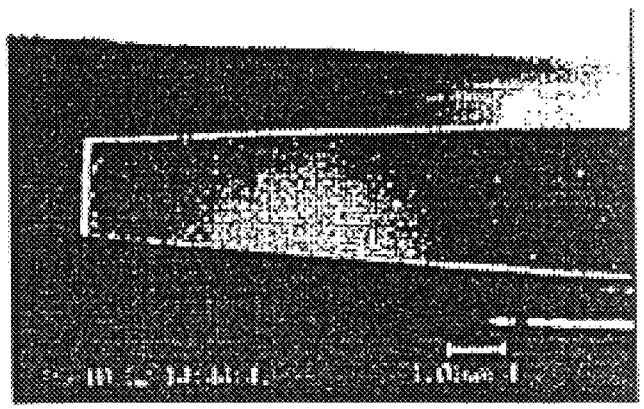
Figure 6A:
FIG. 6 is an explanatory pattern diagram showing "liquid paddles" and "running stain" according to the third embodiment.
Figure 6B:
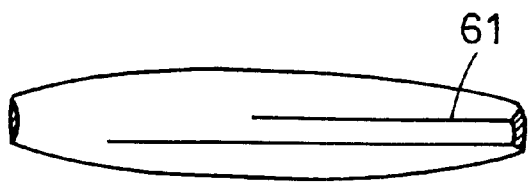

FIG. 5 is a photograph of the reflecting surface of the polygon mirror taken when a film was formed by rotating at 1500 rpm for 120 seconds (FIG. 5A), and at 2500 rpm for 120 seconds (FIG. 5B), and FIG. 6 is an image supplementing the photographs in FIG. 5.

When films were formed with the time period of rotation fixed to 120 seconds and the number of revolutions varied by 500 rpm from 1000 to 3000 rpm, there were cases where "liquid paddles" 60, which was a liquid stayed at the ends of the reflecting surface as shown in FIG. 5A, appeared at 1500 rpm or below. On the other hand, at 2500 rpm or more, there were cases where the stain of the liquid run quickly on the reflecting surface ("running stain" 61) appeared as shown in FIG. 5B. When the polygon mirror was rotated at 2000 rpm, the "liquid paddles" was restrained to 0.5 mm or less, and the "running stain" could not found. The results are tabulated in FIG. 2. In the table, 0/10 means that liquid puddles or running stain were observed zero time out of ten times of tests.

TABLE 2

| Number of revolution (rpm) | Liquid paddles | Running stains |
| --- | --- | --- |
| 1000 | 10/10 found | 0/10 not found |
| 1500 | 7/10 found | 0/10 not found |
| 2000 | 0/10 not found | 0/10 not found |
| 2500 | 0/10 not found | 1/10 found |
| 3000 | 0/10 not found | 3/10 found |

The liquid paddles found when the polygon mirror is rotated at 1000 rpm, 1500 rpm for 120 seconds can be prevented by rotating for 120 seconds and then rotating at 2000 rpm for 10 seconds. The running stains found when the polygon mirror was rotated at 2500 rpm and 3000 rpm for 120 seconds can be prevented by rotating at 2500 for 20 seconds, or at 3000 rpm for 15 seconds, and then rotating at 2000 rpm for 120 seconds.

When the polygon mirror is rotated at the fixed number of revolutions of 2000 rpm every 30 seconds from 30 to 150 seconds to form a film, the "liquid paddles" of 0.5 mm or larger were often found when rotated for 90 seconds or less, and they became smaller in size to 0.5 mm or less when rotated for 120 seconds or more. The results are tabulated in table 3.

TABLE 3

| Time period of rotation | Liquid paddles larger than 0.5 mm |
| --- | --- |
| 30 | 10/10 found |
| 60 | 8/10 found |
| 90 | 1/10 found |

TABLE 3-continued

| Time period of rotation | Liquid paddles larger than 0.5 mm |
|---|---|
| 120 | 0/10 not found |
| 150 | 0/10 not found |

The liquid paddles that may occur when rotated at 2000 rpm for 30 seconds, 60 seconds, and 90 seconds can be prevented by elongating the time period of rotation. It can also be prevented by rotating at 2000 rpm for 30 seconds, 60 seconds, and 90 seconds, and then rotating at 3000 rpm for 15 seconds. According to this embodiment, when the rotating film-forming method using an amorphous fluorochemical resin is applied to the aluminum six-surface polygon mirror of which a diameter of the circumscribed cylinder is 40 mm considering the least expensive mechanism in terms of manufacture, rotation for at least 120 seconds at 2000 rpm seems to be preferable when the number of revolutions are fixed. By rotating under the conditions described above, a uniform film can be formed quite stably with a less expensive apparatus.

[Embodiment 4]

In this embodiment, the optimal concentration for the solution was inspected by determining only the concentration of the solution as a parameter, and measuring variations in reflectance by the angles as in the case of Embodiment 2.

Figure 7:
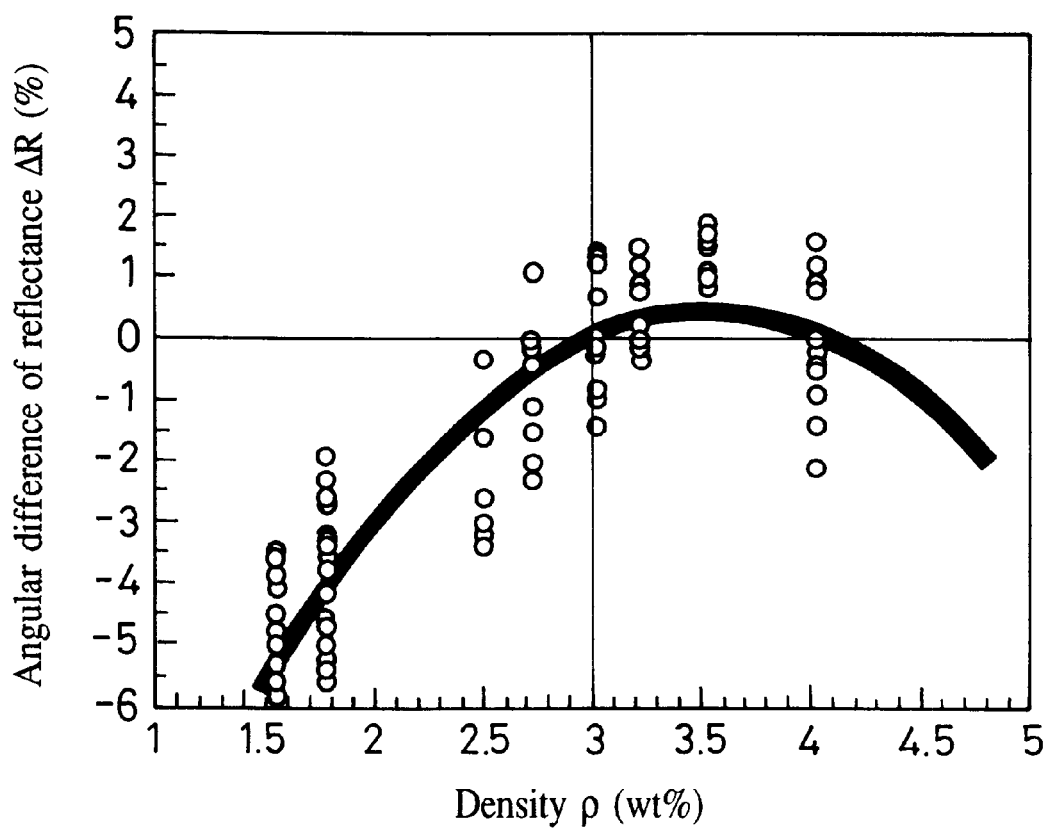
FIG. 7 is an explanatory drawing showing the relation between the concentration of an amorphous fluorochemical resin solution and the variations in reflectance by the angles of incident within the range of 15°–56° according to the fourth embodiment.

FIG. 7 shows the results of applying the rotating wet film-forming method with the concentrations of solution varied within the range of 1.5–4.0 wt % (the thicknesses of formed films differ from each other) and measuring variations in reflectance by the angles. Though there were some variations in data, they roughly described an upwardly projecting curve, and the concentrations that seemed to show the least angle dependence of the reflectance were within the range of 2.9–3.0 wt %.

In this embodiment, even when the angle dependence is high as in the case where the concentration of the solution is 1.5%, the angle dependence can be restrained by controlling other manufacturing conditions, such as the speed of rotation.

[Embodiment 5]

The polygon mirrors shown in Embodiments 1 to 3 were mounted on the scanner motor, and arranged with a rotatable light deflector, a light source (semiconductor laser), an image forming optical system, and a scanning lens as shown in FIG. 8 to construct an optical scanner. Then electrophotographic equipment was constructed using this optical scanner. Electrophotographic equipment used here was an electrophotograph comprising means for charging the photoreceptor, exposing means for exposing the charged photoreceptor and forming a latent image, toner image forming means for supplying toner to the latent image and forming a toner image, transferring means for transferring the toner image onto a transcriptional material, and cleaning means for removing residuals or foreign substances from the surface of the photoreceptor, and the exposing means used was the optical scanner described above.

When pattern images and picture images were read out repeatedly by the use of the electrophotograph, the quality of the picture and the durability were both at the level of the case where the conventional polygon mirror was used. In other words, the polygon mirror of the present invention complied with the functions required for the conventional polygon mirror, and thus there was no problem when it was used instead of the conventional polygon mirror.

[Embodiment 6]

This embodiment shows that variations in film thickness and in angular dependence of the reflectance can be restrained by applying the coating liquid only in the area of the polygon mirror of which the distance from the axis of rotation is not less than Ri (the area of the reflecting surface outside the inscribed cylinder).

An amorphous fluorochemical resin was applied on the six-surface polygon mirror of which a radius of the circumscribed cylinder was 20 mm (radius of inscribed cylinder Ri=17.3 mm) and the reflecting surfaces were formed into hexagonal prism shape according to the rotating film-forming method, and then an experiment was conducted before starting rotation under the conditions shown in Table 4, where R is the distance between the axis of the coating liquid on the reflecting surface for controlling the film thickness. The results of the experiment will be shown in Table 5. The number of measurement was 30 times for each condition. The coating liquid used was the substance (Name of the commodity: CT-solv.180: Asahi Glass Company) shown in the constitutional formula (3), containing 2.7 wt % of an amorphous fluorochemical resin (Name of the commodity: Cytop CTL-802: Asahi Glass Company).

The application procedure was such that the polygon mirror was rotated at 40 rpm and held at the distance shown in Table 4 for 10 seconds.

The number of revolutions and the time period of rotation in the coating film forming process were 2000 rpm and 120 seconds respectively.

The coated film was sintered in the furnace heated to 180° C. for 40 minutes.

TABLE 4

| Conditions | R |
|---|---|
| A | 18.0 mm |
| B | 17.5 mm |
| C | 17.0 mm |
| D | 16.5 mm |

TABLE 5

| Conditions | Items | 15° | 35° | 56° | P—P |
|---|---|---|---|---|---|
| A | Average Reflectance (%) | 78.3 | 78.7 | 79.5 | 1.2 |
| R = 18.0 | Standard Deviation | 0.12 | 0.08 | 0.10 | 0.13 |
| B | Average Reflectance (%) | 78.5 | 78.7 | 79.4 | 0.9 |
| R = 17.5 | Standard Deviation | 0.15 | 0.09 | 0.10 | 0.13 |
| C | Average Reflectance (%) | 78.8 | 79.7 | 79.3 | 0.9 |
| R = 17.0 | Standard Deviation | 0.43 | 0.21 | 0.13 | 0.32 |
| D | Average Reflectance (%) | 78.9 | 79.6 | 79.3 | 0.5 |
| R = 16.5 | Standard Deviation | 0.45 | 0.24 | 0.12 | 0.34 |

As seen in the Table, variations in reflectance is smaller under the conditions A and B than the conditions C and D at each angle of incident, 15°, 35°, and 56° with the radius of the cylinder inscribed in the reflecting surface Ri (=17.3 mm) as a border. In other words, since variations in reflectance is nothing but variations in film thickness, variation in film thickness can be preferably restrained when the coating area is limited to the outside the inscribed cylinder. When comparing by the value P—P which is the difference between the maximum value and the minimum value among the reflectances at the angles of incident 15°, 35°, and 56°, variations under the conditions A and B is half those under the conditions C and D. In other words, when the coating area is limited to the outside the cylinder inscribed in the reflecting surface, variations in angle dependence of the reflectance can be preferably restrained.

Variations in reflectance occurred under the conditions C and D and variations in film thickness can be prevented by starting rotation after removing the solution applied inside the circle inscribed in the reflecting surface. However, when less expensive and less complicated construction is considered, it is more preferable to apply the solution only on the outside the circle inscribed in the reflecting surface than utilizing the solution removing means described above.

[Embodiment 7]

This embodiment shows that the accidental irregular configuration of the film can be restrained by limiting the coating area on the polygon mirror only to the area of which the distance from the axis of rotation is at least Ri (outside the cylinder inscribed in the reflecting surface). The film condition without irregularities of configuration is shown in FIG. 9A.

Sol-Gel film of $SiO_2$ is applied on the four-surface polygon mirror having the reflecting surface of regular quadrangular prism shape and the radius of the cylinder circumscribed on the reflecting surface of 10 mm according to the rotating wet film-forming method, and the rates of occurrence of "running stains" 61 that are traces of running liquid as shown in FIG. 9B or "liquid paddles" 60 that are traces of liquid remaining in the areas of 0.3 mm from the ends of the reflecting surface as shown in FIG. 9C were compared. The coating liquid was isopropyl alcohol containing 2 wt % of ethyl silicate. The conditions of experiment are shown in Table 6. The number of times of measurement was 120 times for each condition.

The application procedure was such that the polygon mirror was rotated at 40 rpm at the distance shown in Table 6 for 10 seconds.

The number of revolutions and the time period of rotation in the coating film forming process were 2000 rpm and 120 seconds respectively.

The coated film was sintered in the furnace heated to 180° C. for 40 minutes.

TABLE 6

| Condition | Running stains (%) | Liquid puddles (%) |
|---|---|---|
| A | one or more 0.8 | |
| R = 8.0 | two or more 0.3 | 1.0 |
| B | one or more 1.2 | |
| R = 7.5 | two or more 0.2 | 0.6 |
| C | one or more 18.6 | |
| R = 7.0 | two or more 5.6 | 2.2 |
| D | one or more 22.4 | |
| R = 6.5 | two or more 6.8 | 1.8 |

As seen in the Table 6, the rates of occurrence of "running stains" and "liquid paddles" were lower in the case where the coating area is only outside the cylinder inscribed in the reflecting surface (conditions A and B) than the case where the coating area extends to the inside of the cylinder inscribed in the reflecting surface (conditions C and D). In other words, accidental irregularity in configuration of the film may be preferably restrained by limiting the coating area to the outside the cylinder inscribed in the reflecting surface.

The "running stains" and "liquid paddles" that occurred significantly under the conditions C and D may be restrained to 1.5% or less respectively by starting rotation after removing the liquid applied inside of the circle inscribed in the reflecting surface. However, when less expensive and less complicated construction is considered, it is more preferable to apply the solution only on the outside the circle inscribed in the reflecting surface than utilizing the solution removing means described above.

[Embodiment 8]

This embodiment shows one of the most preferable examples of how to apply the coating liquid on the reflecting surface before staring rotation for controlling the film thickness in the rotating wet film-forming method.

In the six-surface polygon mirror of which the radius of the circumscribed cylinder was 20 mm and the reflecting surface formed a regular hexagonal prism, the time period required for applying the coating liquid over the entire reflecting surface at the number of revolutions of 40 rpm was examined while determining the distance R between the axis of rotation and the surface of the coating liquid as a parameter.

Figure 10:
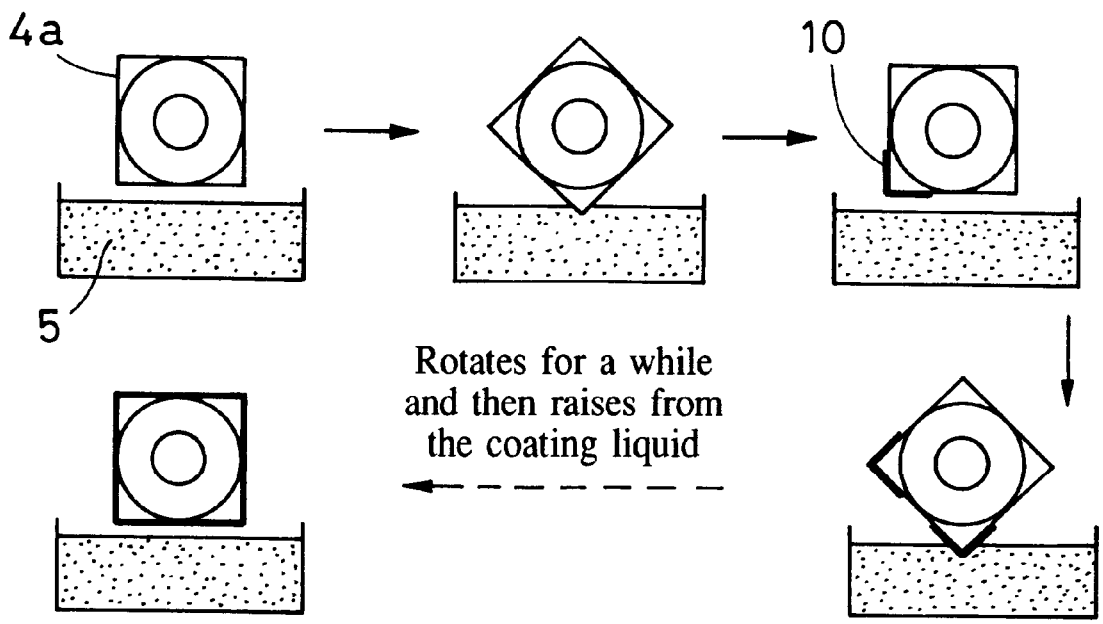
FIG. 10 is a schematic drawing showing a method of application according to the eighth embodiment.

The procedure is shown in FIG. 10. In FIG. 10, a four-surface polygon mirror is shown in the interest of clarity. First of all, the polygon mirror on which a film is to be formed was set above the coating liquid so as to satisfy the inequality Ri<R<Ro and so that the polygon mirror does not come into contact with the coating liquid. When the polygon mirror was rotated, the coating liquid was applied to the corner of the polygon mirror (the portion shown by the reference numeral 10 in the figure). The coating liquid then spread over by the rotation, and at last, the coating liquid is applied all over the reflecting surface 4a. The coating liquid is a substance (Name of the commodity: CT-solv.180: Asahi Glass Company) shown in the constitutional formula (3) containing 2.0 wt % of amorphous fluorochemical resin (Name of the commodity: Cytop CTL-802: Asahi Glass Company)(constitutional formula (1)).

From the results shown in Table 7, it is understood that the coating liquid was applied completely over the reflecting surface without immersing the reflecting surface completely in the coating liquid.

TABLE 7

| R | Time period |
|---|---|
| 17.5 | 5 seconds or less |
| 18.0 | 5 seconds or less |
| 18.5 | 5 seconds or less |
| 19.0 | 7 seconds |
| 19.5 | 16 seconds |

As a next step, the coating liquid was applied in the same manner as the example above with the time period of application determined to 5 seconds and the distances between the axis of rotation and the surface of the coating liquid to 18.0 and 19.0 mm, and with the number of revolutions determined as a parameters shown in Table 8. In the Table, G designates that the coating liquid is spread well all over the reflecting surface, M designates that it is spread all over in 5 to 20 seconds, and B designates that the it cannot be spread all over within 20 seconds. As is clear from this table, the coating liquid is spread all over the surface at 300 rpm or less when R=18.0 mm, and is spread all over the surface at 160 rpm or less when R=19.0 mm. However, it was found that even with R=18.0 mm, the surface of the coating liquid is ruffled very much when the number of revolution exceeds 300 rpm, and thus the desired amount of coating liquid cannot be applied. Therefore, under the conditions of this experiment, it is referable that the suitable number or revolutions is 200 rpm or below.

TABLE 8

| Number of revolutions | R = 18.0 mm | R = 19.0 mm |
| --- | --- | --- |
| 40 | G | B |
| 80 | G | G |
| 120 | G | G |
| 160 | G | G |
| 200 | G | M |
| 300 | G | B |
| 400 | M | B |

[Embodiments 9]

In this embodiment, typical examples that are conceivable as manners of applying the coating liquid on the reflecting surface before starting rotation for controlling the film thickness in the rotating wet film-forming method are shown below, and the resultant states of application are shown in the Table 9. The polygon mirror used here was four-surface polygon mirror of which the radius of the circumscribed cylinder was 10.0 mm, and the reflecting surfaces formed in regular quadrangular prism shape (radius of inscribed cylinder: 7.1 mm), and the coating liquid used here was a substance (Name of the commodity: CT-solv.180: Asahi Glass Company) shown in the constitutional formula (3) containing 2.0 wt % of amorphous fluorochemical resin (Name of the commodity: Cytop CTL-802: Asahi Glass Company). The number of tests was 10 times respectively.

Example I is performed in the same manner as Embodiment 7, and the number of revolutions was 40 rpm, the time period of application was 5 sec, and the distance R between the axis of rotation and the surface of the coating liquid was 8.0 mm.

Figure 11:
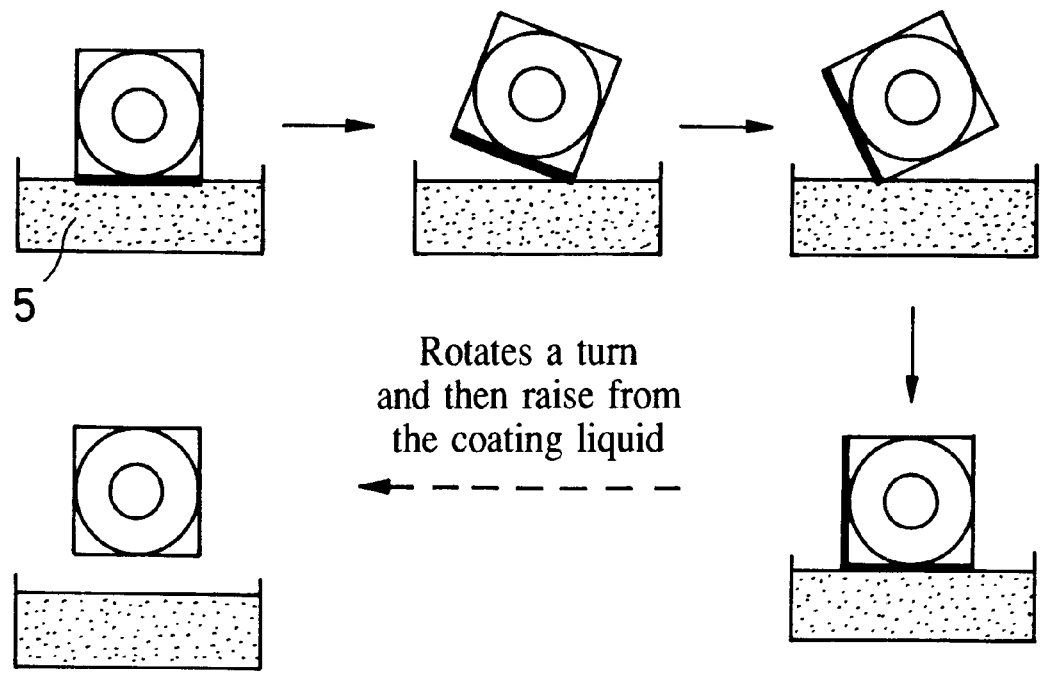
FIG. 11 is a schematic drawing showing a method of application II according to the ninth embodiment.

In Example II, as shown schematically in FIG. 11, the polygon mirror was immersed into the coating liquid so as to bring the reflecting surface into contact with the surface of the coating liquid while keeping the reflecting surface in parallel with the surface of the coating liquid. It is also conceivable to place the reflecting surface horizontally once and then to bring it closer into contact with the surface of the coating liquid. However, in this example, application was performed by rotating the polygon mirror at a constant speed (30 rpm) while taking notice that the applied liquid did not spread to the area within the cylinder inscribed in the reflecting surface, and then elevating the surface of the coating liquid at the timings when the reflecting surface took the horizontal position and bringing the reflecting surface into contact with the coating liquid.

Figure 12:
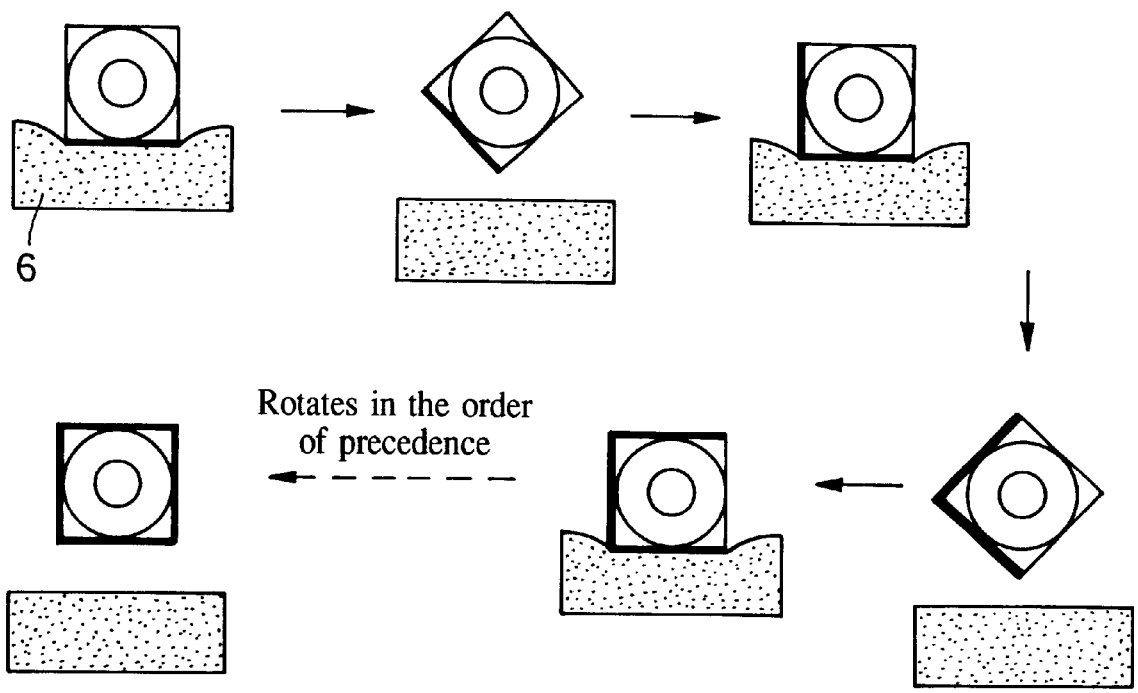
FIG. 12 is a schematic drawing showing a method of application III according to the ninth embodiment.

In Example III, as shown schematically in FIG. 12, a medium 6 containing sufficient amount of coating liquid was pushed against the reflecting surfaces successively to apply the coating liquid only on the reflecting surfaces. In this example, sponge foam (white wiper manufactured by Bridgestone) that can contain a sufficient amount of coating liquid and is soft enough to prevent the reflecting surface from being scratched was used as the medium.

Figure 13:
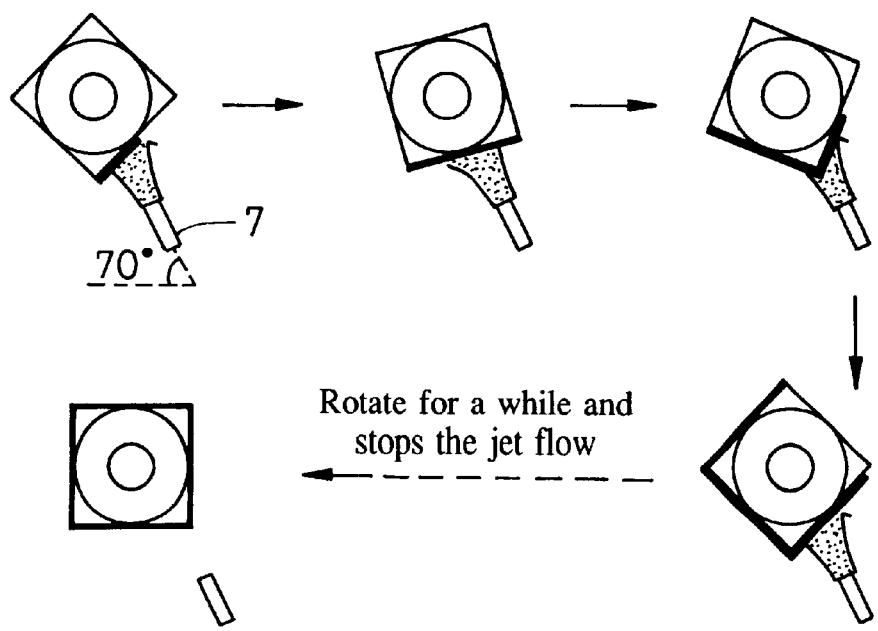
FIG. 13 is a schematic drawing showing a method of application IV according to the ninth embodiment.

In Example IV, as shown schematically in FIG. 13, the coating liquid was applied on the reflecting surface by spraying the coating liquid on the reflecting surface from the nozzle 7. In this example, the discharge rate of jet flow was 10 ml/sec, the diameter of the nozzle in cross section was 1 mm, the jet flow was directed at the angle of elevation of 70°, and the polygon mirror was rotated at 10 rpm.

Figure 14:
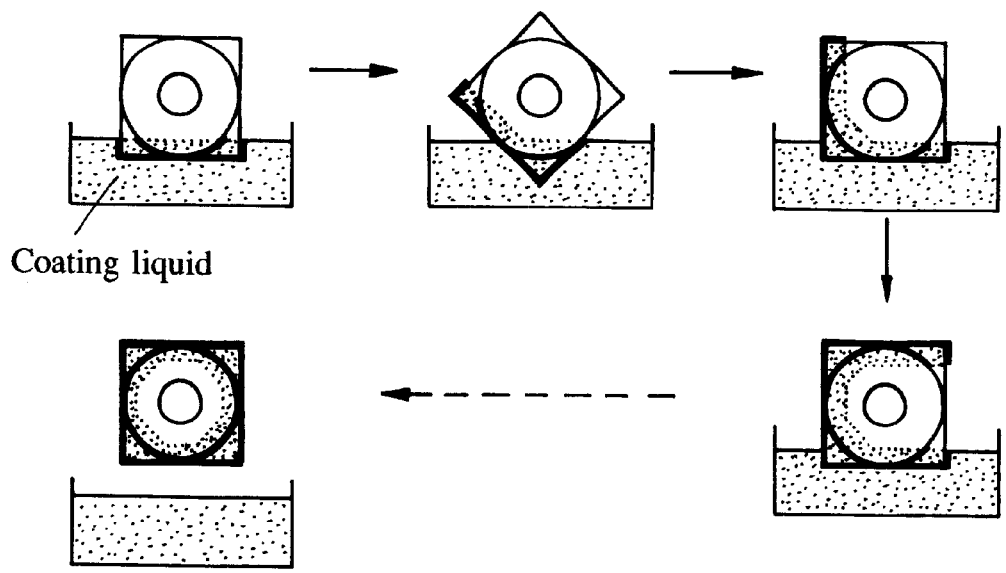
FIG. 14 is a schematic drawing showing a method of application V according to the ninth embodiment.

Example V was performed in the same manner as Example I except that the distance between the axis of rotation and the surface of coating liquid was 6.0 as shown in FIG. 14.

The coating liquid was applied in the manner described above, and the film forming step was performed by rotating the polygon mirror at 2000 rpm for 120 seconds and sintering it at 180° C. Then, the value "P—P" that represents the difference between the maximum value and the minimum value among the reflectances at the angles of incident 15°, 35°, and 56° was obtained as in the case of Embodiment 6, and standard deviation thereof was calculated (variations in P—P), and the running stains were observed. The results were shown in Table 9.

TABLE 9

| Examples | Coating area | Variations in P—P | Nr. of occurence of running stain |
| --- | --- | --- | --- |
| I | R > 8.0 mm | 0.13 | 0 |
| II | reflecting surface only | 0.18 | 0 |
| III | reflecting surface only | 0.16 | 0 |
| IV | reflecting surface only | 0.16 | 0 |
| V | R > 6.0 mm | 0.36 | 3 |

As seen in Table 9, except for Example V in which the application extends to the inside of the cylinder inscribed in the reflecting surface, the coating area was outside the cylinder inscribed in the reflecting surface, and thus, preferably, variations in reflectance and accidental irregularity of film thickness were both restrained quite satisfactorily.

[Embodiment 10]

This embodiment shows that angle-independent uniformity of the reflectance can be obtained by distributing the film thickness for a wide range of the angles of incident of p-polarization.

Figure 15:
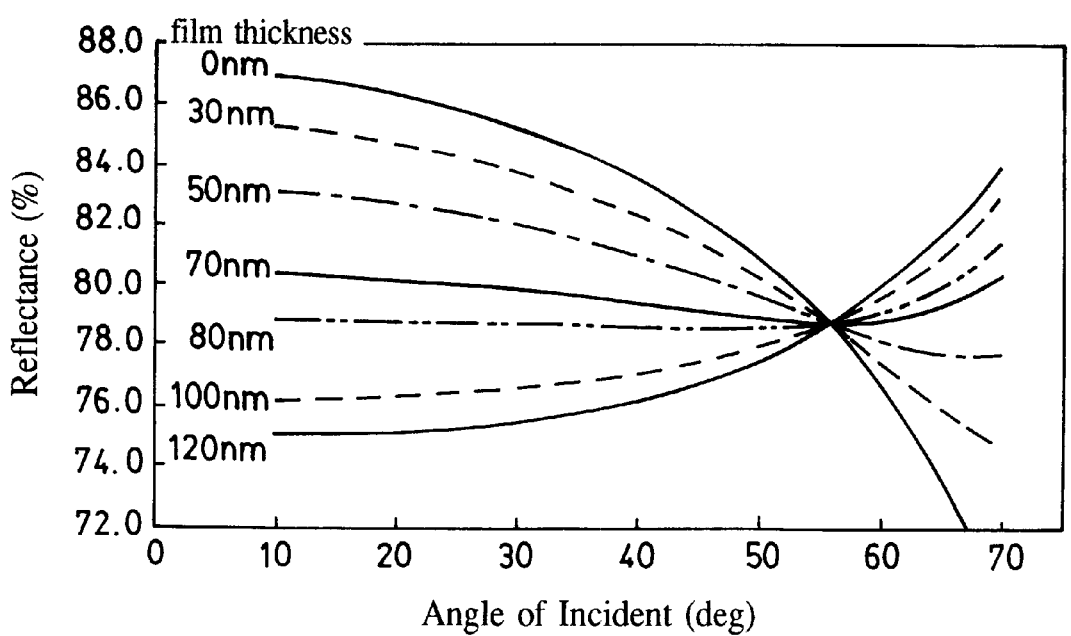
FIG. 15 is an explanatory drawing showing the relation between the angles of incident and the reflectance when a uniform thickness of $SiO_2$ film is formed on a base member made of aluminum according to the tenth embodiment.

FIG. 15 is a drawing showing the case where a uniform film of $SiO_2$ was formed on the aluminum base member as an example of the relations among the film thickness, the angle of incident, and the reflectance when the uniform film thickness was formed. It was found that there exists Brewster's angle, or the angles of incident that gives a constant reflectance regardless of the film thickness. In this case, the reflectance decreases with increase in film thickness in the area that accommodates the angles of incident narrower than Brewster's angle, and in contrast to it, the reflectance increases with the film thickness in the area that accommodates the angles of incident wider than Brewster's angle.

Figure 16A:
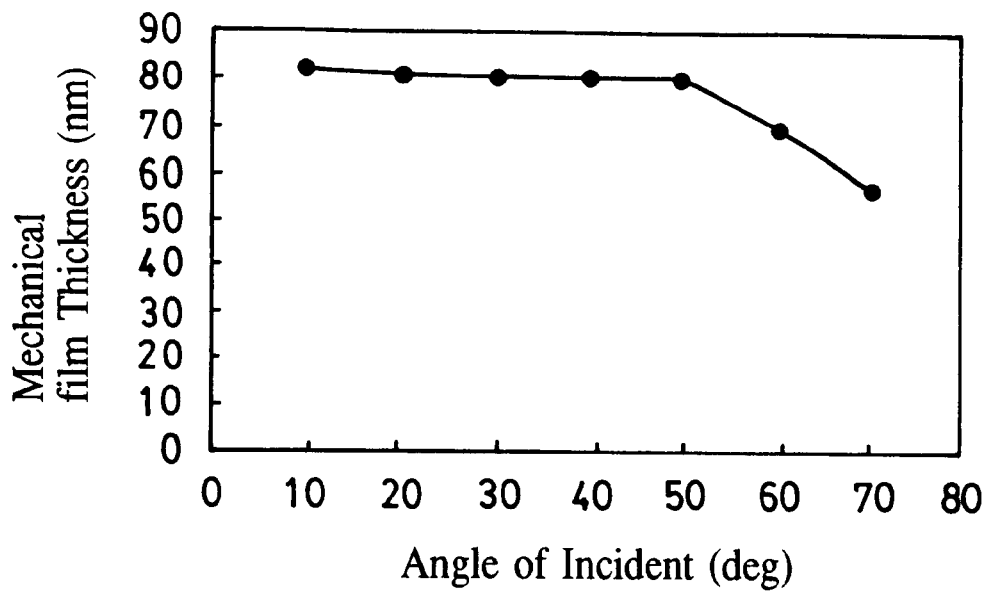
FIG. 16A and FIG. 16B are distribution of film thicknesses with respect to the angles of incident, and the reflectances with respect to the angles of incident respectively, when $SiO_2$ film is formed on the base member of aluminum with the desired distribution of film thickness according to the tenth embodiment.

FIG. 16A is a distribution of film thicknesses in the case where a film of $SiO_2$ is formed on the aluminum base member. Since the relation between the position on the reflecting surface of the polygon mirror and the angle of incident of light is 1:1, the horizontal axis represents the corresponding angles of incident. This distribution of film thicknesses was determined in the following manner. At each position on the reflecting surface corresponding to the angles of incident 10–70°, the film thickness on which the reflectance (78.8%) at Brewster's angle (55°) can be obtained was calculated.

Figure 16B:
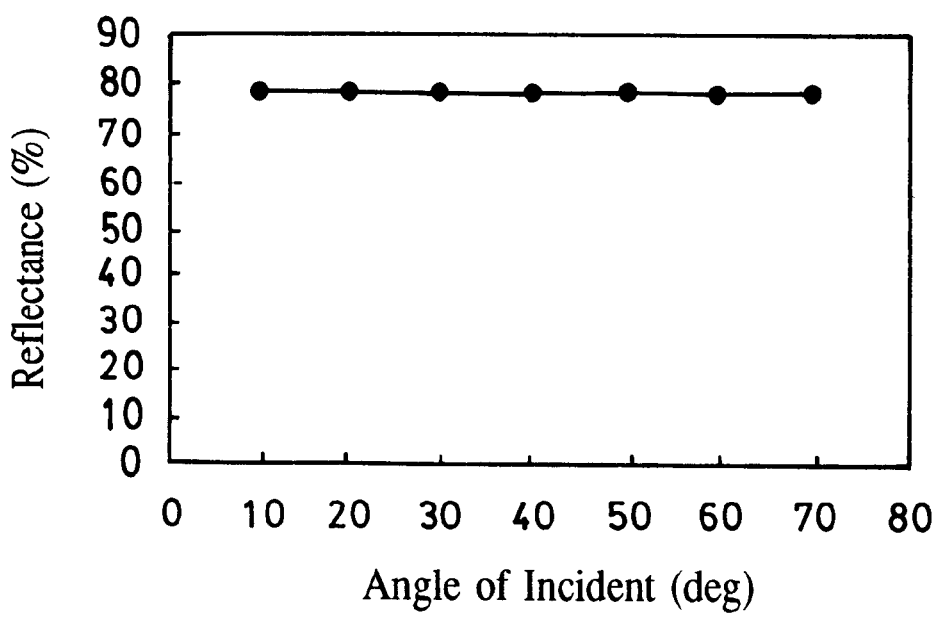

FIG. 16B is a drawing showing the reflectance for the distribution of film thicknesses described above. From the figure, it was found that the reflectance was constant for the angles of incident when the distribution of film thicknesses described above was formed.

Table 10 shows the reflectances obtained at the angles of incident of 10–70° on the films of TiO2, Al203, SiO2 and an amorphous fluorochemical resin (Name of the commodity: Cytop CTL-802: Asahi Glass Company) on the aluminum base member at a uniform thickness by dipping. In the table, B.A. means Brewster's angle. As seen in the table, the reflectance is relatively uniform in the area that accommodates the angles of incident narrower than Brewster's angle, but the reflectances varies abruptly in the area that accommodates the angles of incident wider than Brewster' angle.

TABLE 10

| Film Material | | Angles of incident | | | | |
|---|---|---|---|---|---|---|
| | | 10° | 25° | 40° | 55° | 70° |
| TiO2 B.A. = 62° | mechanical film thickness (nm) | 48 | 48 | 48 | 48 | 48 |
| | reflectance (%) | 75.9 | 75 | 74.4 | 75.4 | 77.6 |
| Al2O3 B.A. = 60° | mechanical film thickness (nm) | 55 | 55 | 55 | 55 | 55 |
| | reflectance (%) | 76.4 | 76.2 | 76.3 | 76.4 | 77.7 |
| SiO2 B.A. = 55° | mechanical film thickness (nm) | 80 | 80 | 80 | 80 | 80 |
| | reflectance (%) | 78.8 | 78.8 | 78.7 | 78.8 | 81.6 |
| amorphous fluoro-chemical resin B.A = 54° | mechanical film thickness (nm) | 98 | 98 | 98 | 98 | 98 |
| | reflectance (%) | 79.3 | 79.3 | 79.3 | 79.3 | 82.5 |

Table 11 shows the results of forming various single layer films with distribution of film thicknesses on the aluminum base member by dipping, and measuring the reflectance thereon. In this case, the film thickness giving the same reflectance as Brewster's angle was calculated, and the raising speed was controlled so that the film thickness can be obtained at each position on the reflecting surface in the film forming step. As seen in Table 11, it was found that the reflectance did not vary with the angles and was uniform when the distribution of film thicknesses was provided.

As is clear from Table 10 and Table 11, when the range of the angles of incident of P-polarization was wide, angle-independent uniformity of the reflectance was obtained by providing the distribution of thicknesses as described above.

TABLE 11

| Film Material | | Angles of incident | | | | |
|---|---|---|---|---|---|---|
| | | 10° | 25° | 40° | 55° | 70° |
| TiO2 B.A. = 62° | mechanical film thickness (nm) | 50 | 50 | 49 | 41 | 33 |
| | reflectance (%) | 75.4 | 75.4 | 75.4 | 75.4 | 75.4 |
| Al2O3 B.A. = 60° | mechanical film thickness (nm) | 55 | 53 | 52 | 46 | 39 |
| | reflectance (%) | 76.4 | 76.4 | 76.4 | 76.4 | 76.4 |
| SiO2 B.A. = 55° | mechanical film thickness (nm) | 80 | 78 | 76 | 67 | 58 |
| | reflectance (%) | 78.8 | 78.8 | 78.8 | 78.8 | 78.8 |
| amorphous fluoro-chemical resin B.A = 54° | mechanical film thickness (nm) | 99 | 98 | 98 | 85 | 72 |
| | reflectance (%) | 79.3 | 79.3 | 79.3 | 79.3 | 79.3 |

The reflectance at Brewster's angle does not depend on variations in the film thickness on the surface layer formed on the reflecting surface, and exhibits the reflectance of the lower layer. In other words, when it is a single layer, the reflectance is that of the base member, and when it is multilayer, of the rest of the layers except for the surface layer. Therefore, irrespective of the material of the lower layer and the number of lays, angle-independent uniformity of the reflectance can be realized by forming the distribution of thicknesses as shown above as in Table 11.

[Embodiment 11]

This embodiment shows that angle-independent uniformity of the reflectance can be obtained by reducing the thickness of the film formed on the reflecting surface in the area on which P-polarization is projected at the angle wider than Brewster's angle.

Table 12 shows the reflectances obtained when various types of films were formed on the aluminum based polygon mirror in such a manner that the film thickness in the area that accommodates the angles of incident narrower than Brewster's angle was uniform and that in the area that accommodates the angles of incident wider than Brewster's angle was somewhat thinner than the above described uniform film thickness. The film thickness in the area that accommodates the angles of incident wider than Brewster's angle is determined to be the film thickness that provides the reflectance given at Brewster's angle. In this embodiment, the film thickness was determined to be that provides the reflectance given at Brewster's angle when the angle of incident was 70°.

In this case, angle-independent uniformity of reflectance was found to be superior to the case shown in Table 10 (entirely uniform film thickness).

TABLE 12

| Film Material | | Angles of incident | | | | |
|---|---|---|---|---|---|---|
| | | 10° | 25° | 40° | 55° | 70° |
| TiO2 B.A. = 62° | mechanical film thickness (nm) | 48 | 48 | 48 | 48 | 33 |
| | reflectance (%) | 75.9 | 75 | 74.4 | 75.4 | 75.4 |
| Al2O3 B.A. = 60° | mechanical film thickness (nm) | 55 | 55 | 55 | 55 | 39 |
| | reflectance (%) | 76.4 | 76.2 | 76.3 | 76.4 | 76.4 |
| SiO2 B.A. = 55° | mechanical film thickness (nm) | 80 | 80 | 80 | 80 | 58 |
| | reflectance (%) | 78.8 | 78.8 | 78.7 | 78.8 | 78.8 |
| amorphous fluoro-chemical resin B.A = 54° | mechanical film thickness (nm) | 98 | 98 | 98 | 98 | 72 |
| | reflectance (%) | 79.3 | 79.3 | 79.3 | 79.3 | 79.3 |

[Embodiment 12]

This embodiment shows that angle-independent uniformity of reflectance can be obtained by uniformly inclined film thickness on the optical film formed on the reflecting surface.

Table 13 shows the reflectances obtained when various types of films were formed on the aluminum based polygon mirror in such a manner that a uniform inclination is provided on the distribution of film thicknesses. The inclination was determined in such a manner that the variations in reflectance can be minimized according to the types of the film materials. In this embodiment, the inclination of the film thickness was determined to be 40% for an amorphous fluorochemical resin (The proportion between the thinnest portion and thickest portion of the film was 1:1.4.).

In this case, it was found that angle-independent uniformity of reflectance was superior to the case of the uniform film thickness shown in Table 10.

TABLE 13

| Film Material | | Angles of incident | | | | |
|---|---|---|---|---|---|---|
| | | 10° | 25° | 40° | 55° | 70° |
| TiO2 B.A.= 62° | mechanical film thickness (nm) | 52 | 45 | 41 | 35 | 30 |
| | reflectance (%) | 74.8 | 76.8 | 77 | 75.4 | 74.8 |
| Al2O3 B.A. = 60° | mechanical film thickness (nm) | 60 | 54 | 48 | 42 | 36 |
| | reflectance (%) | 76 | 70 | 77 | 76.4 | 76.2 |
| SiO2 B.A. = 60° | mechanical film thickness (nm) | 82 | 75 | 70 | 64 | 58 |
| | reflectance (%) | 78.6 | 76.5 | 78.4 | 78.8 | 78.8 |

TABLE 13-continued

| Film Material | | 10° | 25° | 40° | 55° | 70° |
|---|---|---|---|---|---|---|
| amorphous fluoro-chemical resin B.A = 54° | mechanical film thickness (nm) | 105 | 98 | 90 | 83 | 75 |
| | reflectance (%) | 79 | 79.3 | 79.6 | 79.3 | 79.3 |

[Embodiment 13]

As in the case of Embodiment 5, an optical scanner and then electrophotographic equipment were constructed using the polygon mirrors shown in Embodiments 10 to 12, and evaluated. The quality of image and durability are both at the level of the case where the conventional polygon mirror was used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of manufacturing a polygon mirror having a film formed on the reflecting surface comprising a step of application for applying a solution containing a substance for forming a film on the reflecting surface, and a subsequent step of forming a coated film for forming a coated film of solution on the reflecting surface by rotating the polygon mirror with the reflecting surface faced in the radial direction, wherein the solution is applied only in the area of which the distance from the axis of rotation of the polygon mirror is at least Ri in the application step, where Ri is the minimum distance between the reflecting surface and the axis of rotation.

2. A method of manufacturing a polygon mirror according to claim 1, wherein the step of application is performed by filling a solution in a bath and rotating under the condition of $Ri \leq R \leq Ro$, where R is the distance between the surface of the solution formed in the bath and the axis of rotation, and Ro is the distance between the position in the reflecting surface farthest from the axis and the axis.

3. A method of manufacturing a polygon mirror according to claim 2, wherein application is performed by the rotation at the number of revolutions that does not ruffle the surface of the coating liquid.

4. A method of manufacturing a polygon mirror according to claim 1, wherein the step of application is performed by filling a solution in the bath and immersing the polygon mirror in the solution in such a manner that the reflecting surface are sequentially brought into contact with the surface of the solution in the bath.

5. A method of manufacturing a polygon mirror according to claim 1, wherein the step of application is performed by pushing a soft medium impregnated with the solution against the reflecting surface.

6. A method of manufacturing a polygon mirror according to claim 1, wherein the step of application is performed by spraying the coating liquid only on the reflecting surface.

* * * * *

UNITED STATES PATENT AND TRADEMARK OFFICE
CERTIFICATE OF CORRECTION

PATENT NO. : 6,648,482 B2
DATED : November 18, 2003
INVENTOR(S) : Hideyuki Hatakeyama et al.

It is certified that error appears in the above-identified patent and that said Letters Patent is hereby corrected as shown below:

Column 5,
Line 17, "form" should read -- from --

Column 9,
Line 6, "form" should read -- from --.

Column 10,
Line 58, "is, and" should read -- and --.

Column 12,
Lines 22, 28, 43 and 54, "paddles" should read -- puddles --;
Line 36, (Table 2), "paddles" should read -- puddles --; and
Line 61, (Table 3) "paddles" should read -- puddles --.

Column 13,
Line 2, (Table 3 - continued). "paddles" should read -- puddles --; and
Line 10, "paddles" should read -- puddles --.

Column 14,
Line 59, the second occurrence of "the" should read -- of the --.

Column 15,
Line 7, the second occurrence of "the" should read -- of the --; and
Lines 24, 53 and 62, "paddles" should read -- puddles --.

Column 16,
Line 1, the third occurrentce of "the" should read -- of the --;
Line 7, "staring" should read -- starting --;
Line 53, "as a " should read -- as --;
Line 56, "the" should be deleted; and
Line 64, "revolution" should read -- revolutions --.

UNITED STATES PATENT AND TRADEMARK OFFICE
CERTIFICATE OF CORRECTION

PATENT NO. : 6,648,482 B2
DATED : November 18, 2003
INVENTOR(S) : Hideyuki Hatakeyama et al.

It is certified that error appears in the above-identified patent and that said Letters Patent is hereby corrected as shown below:

Column 19,
Line 1, "varies" should read -- vary --.

Column 20,
Line 12, "that" should read -- that which --.

Signed and Sealed this

Seventeenth Day of August, 2004

JON W. DUDAS
*Acting Director of the United States Patent and Trademark Office*